(12) United States Patent
Haubold et al.

(10) Patent No.: US 7,699,456 B2
(45) Date of Patent: Apr. 20, 2010

(54) SECURITY PRINTING LIQUID AND METHOD USING NANOPARTICLES

(75) Inventors: Stephan Haubold, Hamburg (DE); Fernando Ibarra, Hamburg (DE)

(73) Assignee: Centrum fur Angewandte Nanotechnologie (CAN) GmbH (DE)

( * ) Notice: Subject to any disclaimer, the term of this patent is extended or adjusted under 35 U.S.C. 154(b) by 0 days.

(21) Appl. No.: 10/498,969

(22) PCT Filed: Dec. 16, 2002

(86) PCT No.: PCT/DE02/04575

§ 371 (c)(1),
(2), (4) Date: Jul. 14, 2004

(87) PCT Pub. No.: WO03/052025

PCT Pub. Date: Jun. 26, 2003

(65) Prior Publication Data

US 2005/0068395 A1    Mar. 31, 2005

(30) Foreign Application Priority Data

Dec. 18, 2001   (DE) ............................... 101 62 329

(51) Int. Cl.
*G01D 11/00* (2006.01)
(52) U.S. Cl. ....................................... 347/100; 347/95
(58) Field of Classification Search ................. 347/100, 347/95, 96, 101; 106/31.6, 31.27, 31.13; 523/160
See application file for complete search history.

(56) References Cited

U.S. PATENT DOCUMENTS 4,888,635 A  *  12/1989  Harada et al. ............... 358/509

(Continued)

FOREIGN PATENT DOCUMENTS

DE          197 54 776         6/1999

(Continued)

OTHER PUBLICATIONS

F.M. Winnik, A.R. Davidson, D.F. Rutland: "Colorless fluorescent nanoparticles for transparencies" Xerox Disclosure Journal, vol. 17, No. 3, 1992, pp. 161-162, XP002237721.

*Primary Examiner*—Manish S Shah
(74) *Attorney, Agent, or Firm*—Scully, Scott, Murphy & Presser, P.C.

(57)            ABSTRACT

The invention relates to a printing method according to which, during the printing process, one or more narrow nozzles eject a printing liquid, and to a printing liquid suitable for such a method. The invention is particularly suitable for forgery-proof printing on papers or articles. According to the invention, the printing liquid contains nanoparticles that can be induced to fluoresce or phosphoresce. Said nanoparticles are small crystalline particles that can be induced to fluoresce or phosphoresce on their own or when mixed with dopants. Individual dots (10, 12) can be printed by means of a printing liquid that contains said nanoparticles. Due to their small size of from 1 to 1000 nanometers, preferably in the range of 300 nanometers or even much smaller depending on nozzle diameter, there is no risk of very narrow ink jet nozzles getting plugged. The induction and fluorescence emission frequency ranges are narrow-band so that for a security control of the print the respective wavelength-specific induction or detection is required, thereby increasing protection against forgery.

25 Claims, 1 Drawing Sheet

U.S. PATENT DOCUMENTS

Figure 1:
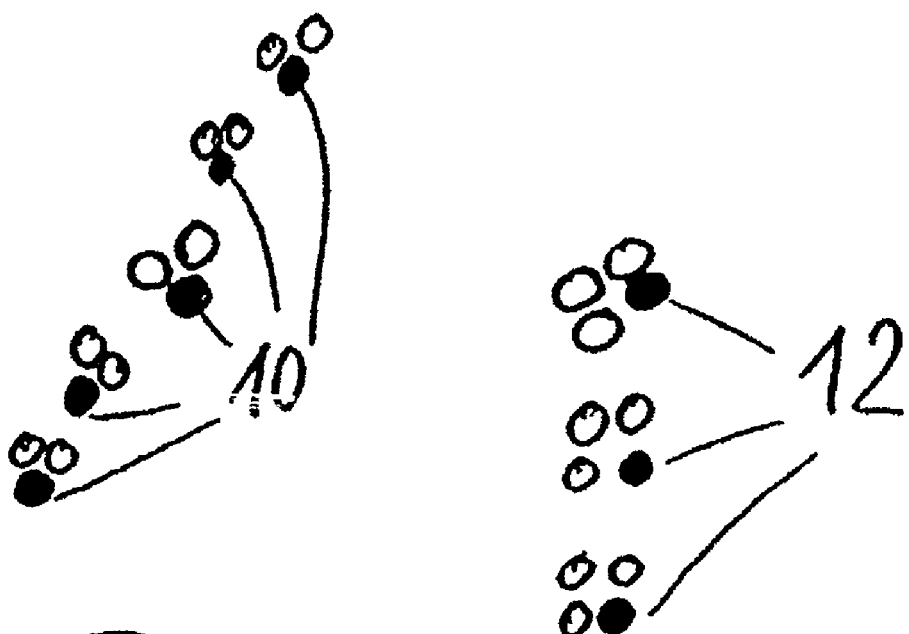

| | | | |
|---|---|---|---|
| 6,030,440 A | 2/2000 | Sekioka et al. | 106/31.5 |
| 6,093,346 A * | 7/2000 | Xiao et al. | 252/301.4 F |
| 6,576,155 B1 * | 6/2003 | Barbera-Guillem | 106/31.64 |
| 2002/0071948 A1 * | 6/2002 | Duff et al. | 106/400 |
| 2004/0014060 A1 * | 1/2004 | Hoheisel et al. | 435/6 |

FOREIGN PATENT DOCUMENTS

| | | |
|---|---|---|
| DE | 198 98 672 C2 | 7/1999 |
| DE | 199 00 856 | 7/1999 |
| EP | 0 147 252 | 7/1985 |
| EP | 0 622 439 A1 | 11/1994 |
| EP | 0 940 265 A2 | 9/1999 |
| EP | 1 027 985 | 8/2000 |
| EP | 1 038 677 | 9/2000 |
| EP | 1 116 755 | 7/2001 |
| EP | 1 116 755 A1 | 7/2001 |
| EP | 1 034 931 | 9/2001 |
| GB | 2 258 659 | 2/1993 |
| JP | 2000-204368 | 7/2000 |
| JP | 2000-256591 A | 9/2000 |
| JP | 2003-089761 | 3/2003 |
| JP | 2003-96340 | 4/2003 |
| WO | WO 00/63317 | 10/2000 |
| WO | WO 01/86299 | 11/2001 |
| WO | WO 02/20696 | 3/2002 |
| WO | WO 02 053677 | 7/2002 |

* cited by examiner

SECURITY PRINTING LIQUID AND METHOD USING NANOPARTICLES

PRIOR ART

The invention is based on a printing method according to which, during the printing process, one or more narrow nozzles eject a printing liquid, and on a printing liquid suitable for such a method. In this case, narrow means a nozzle opening diameter of a few microns. The invention relates in particular to the aspect of forgery-proof printing.

In many sectors there is a great interest in securing prints against forged copies. Particular relevance is exhibited in the production of currency notes, stocks, checks and other papers which represent value or of identity and other identification documents. However, imprints which increase security against forgery are also applied to an increasing extent in the identification verifying the authenticity of products, such as that of CDs, computer chips or drugs.

One known method of protecting against forgeries is the use of graphic security features which, because of their inconspicuousness or microstructure, are not perceived by the naked eye. Thus, with the method disclosed in patent specification DE 197 54 776 A1, very small structures with particularly fine lines of up to 5 microns width can be printed.

In addition, in the method disclosed in patent specification DE 199 00 856 C2, additional secondary information which cannot be detected by the naked eye is further introduced into the visible image to be printed, such as, for example, by changing the shape, the density, the position or the size of the image points.

However, such methods have the disadvantage that the protection against forgeries merely consists in the detectability and reproducibility being made more difficult by particularly small and possibly at the same time hidden structures in the print. Procuring or producing the necessary, particularly high-resolution special printers and their drive means represents a high technical and financial outlay. Nevertheless, with simple optical enlargement means, such as a magnifying glass, this secondary information can be discovered quickly and forged duplicates can be prepared with appropriately high-resolution printers.

Furthermore, printing methods and printing liquids are known in the prior art in which the security against forgery is increased by the use of organic dyes which can be induced to fluoresce. However, such methods and printing liquids have the disadvantage that organic dyes have both a broadband absorption spectrum and a broadband emission spectrum. A sharp delimitation of the absorbable and emitted radiation frequencies, which is necessary for accurate identification, is not possible. Consequently, these methods and printing liquids are inadequate for protection against forgeries.

Likewise inadequate for printing by means of narrow nozzles are known printing methods and printing liquids in which the printing liquid contains micro particles which can be induced to fluoresce and are of the order of magnitude of a few microns. This is because, in the case of narrow nozzles, whose diameter can be down to about 5 microns small, there is a great probability of being blocked quickly by the micro particles.

It is therefore an object of the present invention to provide a printing method according to which, during the printing process, one or more narrow nozzles eject a printing liquid, and a printing liquid suitable for such a method, with improved security against forgery with respect to printing.

ADVANTAGES OF THE INVENTION

The subject of the independent claims achieves this object. The printing liquid according to the invention contains nanoparticles which can be induced to fluoresce or phosphoresce and which, according to the wording, are particles of the order of magnitude of 1 to 1000 nanometers diameter and have a crystal structure. In the case of such small particles, there is no risk of blockage of the narrow nozzles used in the printing process, in particular if they have smaller average diameters than 300 nanometers. The use of printing liquids with such nanoparticles is a simple method of increasing the security against forgery of prints, in particular since, in the case of such crystalline solid bodies which can be induced to fluoresce or phosphoresce, there is a sufficiently sharp delimitation of the absorbable and emitted radiation frequencies for improved forgery-proof identification. Depending on the intended application, the nanoparticles can be excited with UV-A, UV-B or UV-C radiation or with visible light.

The present invention ensures an improvement in security in product protection by marking objects by means of printing liquid containing nanoparticles, in particular one which can be printed by inkjet.

Advantageous developments and improvements of the respective subject of the invention will be found in the subclaims.

With the possibility of printing nanoparticles with an inkjet printer, new possibilities in product protection are provided. In order to create a sufficient distance from a possible forger, use should be made of the fact that a print with an inkjet printer is a dot print. The lines which are visible to the eye consist of a row of dots, a method of representation which is uncommon in other printing methods. If nanoparticles are then used in a multicolor printing process, it becomes more and more difficult to imitate the dot pattern which is produced. Thus, it is possible to cause an image point to be produced from three different individual dots, of which one is a dot specifically marked with nanoparticles.

The detection of such a method should preferably be extremely simple and entail little expenditure on apparatus.

If, for such a security print, use is made for example of a colorless ink containing lanthanum phosphate nanoparticles, and doped with cerium and terbium ($LaPo_4$:Ce;Tb) and two inks each having another color in a multicolor printing method, such as is the case nowadays in commercially available desktop printers, then it is possible to incorporate in a print a security feature which only becomes visible under a UV-C (255 nm) lamp but is not visible under a UV-B (366 nm) lamp.

This means that this print cannot be imitated with organic dyes, since organic fluorescent dyes luminesce under both light sources. A forgery with micro particles—whether organic or inorganic—is likewise prevented in this case, since micro particles cannot be printed by an inkjet method—or generally by a printing method in which the printing ink is ejected through narrow nozzles. Using other printing methods, it is not possible to imitate readily the dot pattern produced in the inkjet printer. Using the known piezo printing method, it is even possible to produce specific printing patterns, depending on the design of the print head.

In summary, the security of the marking is guaranteed by the size and the physical peculiarities of the nanoparticles and by the use of the same in an ink in a multicolor printing method of an inkjet printer.

The present invention is therefore suitable in particular for introducing fluorescent or phosphorescent nanoparticle substances in liquids suitable for printing as a carrier medium, to mix the latter well therein and therefore to carry out a printing method according to the prior art in the form modified in accordance with the invention, or to improve the printing method further with regard to the production of printed security markings, as has been described further above.

In this case, use can be made in particular of those nanoparticles whose synthesis is disclosed in the simultaneously pending patent application PCT/DE01/03433, which is incorporated by reference herein.

These are substantially metal salt nanoparticles with a crystal lattice or whorl lattice, whose cation can be obtained from a cation source and whose anion can be obtained from a material class used as an anion source, it being possible for the whorl or lattice material to contain, in particular, compounds from the group of phosphates, halophosphates, arsenates, sulfates, borates, aluminates, gallates, silicates, germanates, oxides, vanadates, niobates, tantalates, tungstates, molybdates, alkali halides, other halides, nitrides, sulfides, selenides, sulfoselenides and oxysulfides. A dopant or more which may possibly be present can then be selected specifically such that the respectively desired absorption and emission properties can be implemented.

In principle, in the form when nanoparticles are added to one or more colored liquids, the method according to the invention can of course also be applied to achieve "simple" special fluorescence effects. This is substantially to be understood to include all those effects which arise on account of a fluorescent emission which can be perceived in an uncomplicated manner, specifically following excitation with radiation from a spectral range which is common and can be produced simply, even relatively broad, for example visible light or UV-A. In this case, the luminous effect should therefore be visible easily and without further technical aids. For this purpose, those nanoparticles without corresponding security doping, above all those containing phosphorus or fluorine, are then suitable.

The security aspect of the printing method of the present invention is brought about substantially by one or more dopants being added, that is to say incorporated in the whorl material of the nanoparticles, at least one, following appropriate excitation, for example by means of UV-C light, then ensuring an emission which can then be detected. This principle is therefore based on wavelength-specific energy absorption and on wavelength-specific emission of radiation to be detected.

The crystal lattice or, in the case of doping, the whorl lattice, can contain, expressed in general form, compounds of the type XY, X being a cation from one or more elements from the main groups 1a, 2a, 3a, 4a, from the secondary groups 2b, 3b, 4b, 5b, 6b, 7b or the lanthanides (element group of the rare earths) of the periodic system, and Y being a multi-atom anion from one or more elements from the main groups 3a, 4a, 5a, from the secondary groups 3b, 4b, 5b, 6b, 7b and/or 8b and/or elements from the main groups 6a and/or 7, or a single-atom anion from the main group 5a, 6a or 7a of the periodic system.

These are, in particular: phosphates, halophosphates, arsenates, sulfates, borates, aluminates, gallates, silicates, germanates, oxides, vanadates, niobates, tantalates, tungstates, molybdates, alkali halides, other halides, nitrides, sulfides, selenides, sulfoselenides or the oxysulfides.

The dopant used can be one or more elements from a set containing elements from the main groups 1a, 2a or Al, Cr, Tl, Mn, Ag, Cu, As, Nb, Ni, Ti, In, Sb, Ga, Si, Pb, Bi, Zn, Co and/or lanthanide elements.

Amongst others, nanoparticles with one of the following compound can be used for marking. In each case the substance used for doping is noted after the colon:

LiI:Eu; NaI:Tl; CsI:Tl; CsI:Na; LiF:Mg; LiF:Mg,Ti; LiF:Mg,Na; $KMgF_3$:Mn; $Al_2O_3$:Eu; BaFCl:Eu; BaFCl:Sm; BaFBr:Eu; $BaFCl_{0.5}Br_{0.5}$:Sm; $BaY_2F_8$:A (A=Pr, Tm, Er, Ce); $BaSi_2O_5$:Pb; $BaMg_2Al_{16}O_{27}$:Eu; $BaMgAl_{14}O_{23}$:Eu; $BaMgAl_{10}O_{17}$:Eu; (Ba, Mg)$Al_2O_4$:Eu; $Ba_2P_2O_7$:Ti; (Ba, Zn, Mg)$_3Si_2O_7$:Pb; Ce(Mg, Ba)$Al_{11}O_{19}$; $Ce_{0.65}Tb_{0.35}MgAl_{11}O_{19}$; $MgAl_{11}O_{19}$: Ce,Tb; $MgF_2$:Mn; MgS:Eu; MgS:Ce; MgS:Sm; MgS(Sm, Ce); (Mg, Ca)S:Eu; $MgSiO_3$:Mn; $3.5MgO.0.5MgF_2.GeO_2$:Mn; $MgWO_4$:Sm; $MgWO_4$:Pb; $6MgO.As_2O_5$:Mn; (Zn, Mg)$F_2$:Mn; (Zn, Be)$SO_4$:Mn; $Zn_2SiO_4$:Mn; $Zn_2SiO_4$:Mn,As; ZnO:Zn; ZnO:Zn, Si, Ga; $Zn3(PO_4)_2$:Mn; ZnS:A (A=Ag, Al, Cu); (Zn, Cd)S:A (A=Cu, Al, Ag, Ni); $CdBO_4$:Mn; $CaF_2$:Mn; $CaF_2$:Dy; CaS:A (A=lanthanide, Bi); (Ca, Sr)S:Bi; $CaWO_4$:Pb; $CaWO_4$:Sm; $CaSo_4$:A (A=Mn, lanthanide); $3Ca_3(PO_4)_2.Ca$(F, Cl)$_2$:Sb, Mn; $CaSiO_3$:Mn,Pb; $Ca_2Al_2Si_2O_7$:Ce; (CA, Mg)$SiO_3$:Ce; (Ca, Mg)$SiO_3$:Ti; $2SrO.6(B_2O_3).SrF_2$:Eu; $3Sr_3(PO_4)_2.CaCl_2$:Eu; $A_3(PO_4)_2.ACl_2$:Eu(A=Sr, Ca, Ba); (Sr, Mg)$_2P_2O_7$:Eu; (Sr, Mg)$_3(PO_4)_2$:Sn; SrS:Ce; SrS:Sm,Ce; SrS:Sm; SrS:Eu; SrS:Eu,Sm; SrS:Cu,Ag; $Sr_2P_2O_7$:Sn; $Sr_2P_2O_7$:Eu; $Sr_4Al_{14}O_{25}$:Eu; $SrGa_2S_4$:A (A=lanthanide, Pb); $SrGa_2S_4$:Pb; $Sr_3Gd_2Si_6O_{18}$:Pb,Mn; $YF_3$:Yb,Er; $YF_3$:Ln (Ln=lanthanide); $YLiF_4$:Ln (Ln=lanthanide); $Y_3Al_5O_{12}$:Ln (Ln=lanthanide); $YAl_3(BO_4)_3$:Nd,Yb; (Y,Ga)$BO_3$:Eu; (Y,Gd)$BO_3$:Eu; $Y_2Al_3Ga_2O_{12}$:Tb; $Y_2SiO_5$:Ln (Ln=lanthanide); $Y_2O_3$:Ln (Ln=lanthanide); $Y_2O_2S$:Ln (Ln=lanthanide); $YVO_4$:A (A=lanthanide, In); $Y(P,V)O_4$:Eu; $YTaO_4$:Nb; $YAlO_3$:A (A=Pr, Tm, Er, Ce); YOCl:Yb,Er; $LnPO_4$:Ce,Tb (Ln=lanthanide or mixtures of lanthanides); $LuVO_4$:Eu; $GdVO_4$:Eu; $Gd_2O_2S$:Tb; $GdMgB_5O_{10}$:Ce,Tb; LaOBrTb; $La_2O_2S$:Tb; $LaF_3$:Nd,Ce; $BaYb_2F_8$:Eu; $NaYF_4$:Yb,Er; $NaGdF_4$:Yb,Er; $NaLaF_4$:Yb,Er; $LaF_3$:Yb,Er,Tm; $BaYF_5$:Yb,Er; $Ga_2O_3$:Dy; GaN:A (A=Pr, Eu, Er, Tm); $Bi_4Ge_3O_{12}$; $LiNbO_3$:Nd,Yb; $LiNbO_3$:Er; $LiCaAlF_6$:Ce; $LiSrAlF_6$:Ce; $LiLuF_4$:A (A=Pr, Tm, Er, Ce); $GD_3Ga_5O_{12}$:Tb; $GD_3Ga_5O_{12}$:Eu; $Li_2B_4O_7$:Mn,$SiO_x$:Er,Al (0<x<2).

In an advantageous way, nanoparticles with one of the following compound can be used according to the invention, since, as is known, they are well-suited for fluorescence:

$YVO_4$:Eu; $YVO_4$:Sm; $YVO_4$:Dy; $LaPO_4$:Eu; $LaPO_4$:Ce; $LaPO_4$:Ce,Tb; ZnS:Tb; $ZnS:TbF_3$; ZnS:Eu; $ZnS:EuF_3$; $Y_2O_3$:Eu; $Y_2O_2S$:Eu; $Y_2SiO_5$; $SiO_2$:Dy; $SiO_2$:Al; $Y_2O_3$:Tb; CdS:Mn; ZnS:Tb; ZnS:Ag; ZnS:Cu; $Ca3(PO_4)_2$:$Eu^{2+}$; $Ca3(PO_4)_2$:$Eu^{2+}$,$Mn^{2+}$; $Sr_2SiO_4$:$Eu^{2+}$; or $BaAl_2O_4$:$Eu^{2+}$.

Or, in addition, the following: $MgF_2$:Mn; ZnS:Mn; ZnS:Ag; ZnS:Cu; $CaSiO_3$:A; CaS:A; CaO:A; ZnS:A; $Y_2O_3$:A or $MgF_2$:A (A=lanthanides).

As a doping, two elements in a predetermined relative concentration with each other can advantageously be contained, one doping element having a local maximum of the absorption spectrum to light, in particular UV light, and the other doping element having a fluorescence emission spectrum which has at least one local maximum which is at a distance $\Delta\lambda/\lambda$ of at least 4% from the absorption maximum of the first doping element. The aforementioned lanthanum phosphate with dopings of cerium and terbium is one example of this, one dopant acting as an energy absorber, in particular as a UV light absorber and the other as a fluorescent light emitter.

Increased difficulty of authenticity testing and therefore increased security against forgery is provided in the case of a doping which emits when it was excited with quite specific, narrowband radiation. The emission can additionally also be detectable only with technical aids, for example UV emission or IR emission.

It goes without saying that a printing method according to the invention can also be achieved by the nanoparticles being mixed with one or a plurality or all of the printing inks used. In the case of a three-color print, therefore, for example the red color component could be provided with an appropriate fluorescent nanoparticle mixture. The higher the proportion of the fluorescent nanoparticles in the total volume, the more intensive is the fluorescence and therefore the easier it is to detect the emitted light.

Alternatively, an image point can be produced, not as usual in pixel-based color printing methods, from three individual points of a different color in each case but from a plurality, for example four or five or a higher number.

In addition, in a further advantageous manner for the production of high security markings, specific print heads can be constructed which have a secret pattern arrangement of pixel arrangements. In this case, the pattern arrangement covers an area of 40×40 dots, for example. It can be repeated or modified specifically, for example in accordance with a predefined code—a secret rule—in order to increase the security against forgery further.

A further development according to the invention of the printing method, in which the printing liquid(s) is/are sprayed out through a plurality of narrow nozzles, is the possibility of driving individual nozzles or of subsets of the nozzles with respect to the time duration or intensity of the flow of the printing liquid. For example, by increasing the electric drive voltage on a single driven nozzle of a piezo print head, the flow of the ink can be increased. As a result, the corresponding pixel point can be represented more boldly in a secret pattern arrangement, which represents a further possible variation for a security marking and therefore increases the protection against forgeries.

Depending on the appropriate strategy relating to the utility of the security features on the product to be protected, a route can also be selected in which individual ones of the aforementioned security measures can be combined with one another in order to be able to utilize the effects in each case present selectively in the individual features.

DRAWINGS

Exemplary embodiments of the invention are illustrated in the drawings and explained in more detail in the following description.

Figure 2:
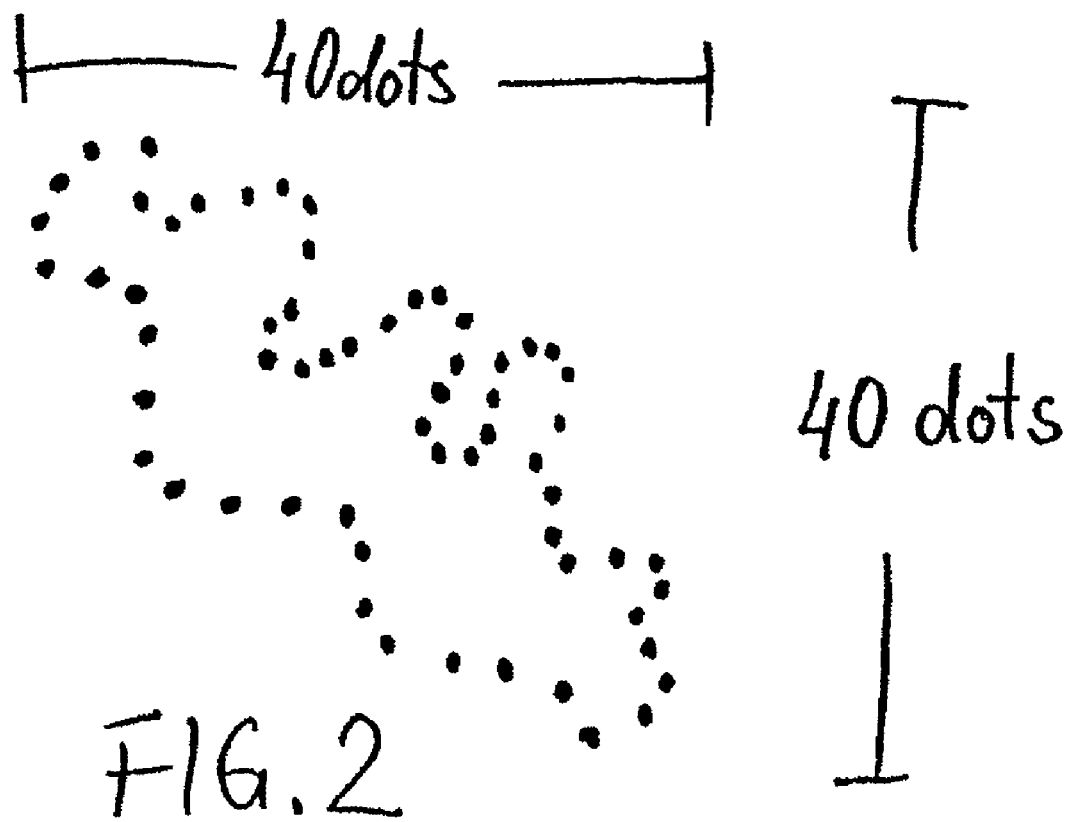

FIG. 1 shows, schematically, two examples of rows of image points which have been printed in accordance with one configuration of the method according to the invention, and FIG. 2 shows, schematically, an example of a secret arrangement of pixel arrangements which has been printed in accordance with a further configuration of the method according to the invention.

DESCRIPTION OF THE EXEMPLARY EMBODIMENTS

In the figures, identical reference symbols designate identical or functionally identical components.

FIG. 1 shows an example, to be understood only schematically, where, on the left, a line pointing obliquely upward and, on the right, a line running vertically, printed as a detail, are shown. The points 10 and 12 shown full—1 of 3 on the left, 1 of 4 on the right—are in each case to be produced from ink supply containers which are enriched with the possibly secretly fluorescing nanoparticles. These nanoparticles are small crystalline particles which, either themselves or with dopants added, can be induced to fluoresce or phosphoresce. Individual dots 10, 12 can be printed with printing liquid containing nanoparticles coming from a special container. Because of their small size of 1 to 1000 nanometers, preferably in the region of 300 nanometers diameter or even very much smaller, depending on the nozzle diameter, there is not the risk of blockage of very narrow inkjet nozzles.

One example of a secret pattern arrangement of pixel arrangements of a specific print head, such as a print head of a piezo printing method, is shown in FIG. 2. In this case, the pattern arrangement covers a region of 40×40 dots in this example. It can, for example, also be repeated or modified specifically in accordance with the predefined code—a secret rule—in order to increase the security against forgery further.

Each individual point in the pattern arrangement is now intended to correspond to a threefold or fourfold image point, as shown in FIG. 1. The pattern can be present repeatedly in a print head, if appropriate repeated many times.

Examples which may be mentioned of the increased difficulty of forging the marking are:

a print head suitable for printing liquids containing nanoparticles, for example for a piezo printing method, or an inkjet method in accordance with the thermally based bubblejet principle, which bears a secret pixel arrangement which is difficult to forge and difficult to detect, or:

the doping of a printing ink component is selected such that the corresponding nanoparticles can be produced synthetically under only extremely difficult conditions.

An example which may be mentioned of the ability to be detected easily, that is to say the ability to verify the authenticity of the marking, is:

the emission of the nanoparticles can easily be detected by the layman, for example the teller in the case of a banknote. This can provide a contribution to configuring banknotes and other printable valuable paper articles to be forgery-proof, the detection of a forgery being capable of demonstration with relatively simple means, depending on the doping.

Although the present invention has been described above by using a preferred exemplary embodiment, it is not restricted thereto but can be modified in many ways.

Finally, the features of the subclaims can be combined with one another substantially freely and not in the order present in the claims, provided they are independent of one another.

The invention claimed is:

1. A printing liquid adapted to be sprayed through narrow nozzles onto objects, wherein the printing liquid consists essentially of a liquid medium and crystalline nanoparticles that can be induced to fluoresce or phosphoresce, said crystalline nanoparticles having a maximum size of 15 nm and a composition selected from the group consisting of phosphates, halophosphates, arsenates, sulfates, borates, aluminates, gallates, germanates, vanadates, niobates, tantalates, tangstates, molybdates, halides and nitrides.

2. The printing liquid as claimed in claim 1, wherein the nanoparticles can be induced to fluoresce or phosphoresce by UV-A, UV-B or UV-C radiation or visible light.

3. The printing liquid as claimed in claim 1, wherein the nanoparticles cause the fluorescent or phosphorescent radiation emitted to lie in an invisible frequency range.

4. The printing liquid as claimed in claim 1, wherein the nanoparticles contain dopants of at least one sort with an excitation frequency range and an emission frequency for fluorescence or phosphorescence.

5. The printing liquid as claimed in claim 4, wherein the excitation frequency range and the emission frequency range of the dopants are frequency-shifted.

6. The printing liquid of claim 5, wherein at least one sort of the dopants can be assigned to the element group of the lanthanides.

7. The printing liquid of claim 6, wherein the dopants comprise chemical elements cerium and terbium.

8. The printing liquid of claim 7, wherein the printing liquid contains lanthanide phosphate particles doped with cerium and terbium.

9. The printing liquid as claimed in claim 4, wherein at least one sort of the dopants can be assigned to the element group of the lanthanides.

10. An object printed with a printing liquid as claimed in claim 1.

11. An ink supply container containing printing liquid as claimed in claim 1.

12. A method for marking objects with printing liquid as claimed in claim 1.

13. A printing liquid according to claim 1, wherein said nanoparticles are selected from the group consisting of phosphates and vanadates.

14. The printing liquid as claimed in claim 1 wherein the halides are alkali halides.

15. A printing method comprising spraying a printing liquid through at least one narrow nozzle, wherein the printing liquid is adapted to be sprayed though narrow nozzles onto objects and wherein the printing liquid consists essentially of a liquid medium and crystalline nanoparticles that can be induced to fluoresce or phosphoresce, said crystalline nanoparticles having a maximum size of 15 nm and a composition selected from the group consisting of phosphates, halophosphates, arsenates, sulfates, borates, aluminates, gallates, germanates, vanadates, niobates, tantalates, tungstates, molybdates, halides and nitrides.

16. The printing method as claimed in claim 15, wherein there is at least one of the printing liquids which is sprayed out through a plurality of narrow nozzles, and driving the nozzles individually or in subsets for causing each of the nozzles spraying and not spraying the printing liquid.

17. The printing method as claimed in claim 16, further comprising driving the nozzles individually or in subsets with respect to the time duration or intensity of the flow of the printing liquid.

18. The printing method as claimed in claim 15, wherein the printing liquid is sprayed out through a plurality of narrow nozzles, and driving the nozzles individually or in subsets with respect to the time duration or intensity of the flow of the printing liquid.

19. The printing method as claimed in claim 15, wherein the method is a piezo printing method.

20. The printing method as claimed in claim 15, wherein the spraying by the nozzles follows a secret rule.

21. A printing apparatus containing devices for implementing the printing method as claimed in claim 15.

22. An object printed in accordance with the method as claimed in claim 15.

23. The method of claim 15, wherein the printing method is an inkjet printing method.

24. A printing method according to claim 15, wherein said nanoparticles are selected from the group consisting of phosphates and vanadates.

25. The printing liquid as claimed in claim 15 wherein the halides are an alkali halides.

* * * * *